US005422398A

United States Patent [19]

Weiss

[11] Patent Number: 5,422,398
[45] Date of Patent: Jun. 6, 1995

[54] COMPATIBILIZER FOR POLYMER BLENDS AND THE POLYMER BLENDS DERIVED THEREFROM

[75] Inventor: Robert A. Weiss, Storrs, Conn.

[73] Assignee: The University of Connecticut, Storrs, Conn.

[21] Appl. No.: 291,746

[22] Filed: Aug. 17, 1994

Related U.S. Application Data

[63] Continuation of Ser. No. 52,809, Apr. 23, 1993, abandoned.

[51] Int. Cl.$^6$ .................. C08L 77/00; C08L 71/12
[52] U.S. Cl. .................. 525/178; 525/179; 525/184; 525/183; 525/166; 525/397; 525/430; 525/439
[58] Field of Search ............... 525/179, 178, 183, 184, 525/166, 397, 439, 430

[56] References Cited

U.S. PATENT DOCUMENTS 3,870,841  3/1975  Makowski ..................... 524/132
4,097,546  6/1978  Lofquist ..................... 525/183

FOREIGN PATENT DOCUMENTS 0045576  11/1980  Japan .
0018670  2/1981   Japan .
1183086   3/1970  United Kingdom .

OTHER PUBLICATIONS

Relstionship Between The Glass Transition Temperature And The Interaction Parameter Of Miscible Polymer Blends–American Chemical Society X LU and R. A. Weiss, Jun. 8, 1992.
Specific Interactions And Ionic Aggregation In Miscible Blends Of Nylon 6 And Zinc Sulfonatd Polystyrene Ionomer–American Chemical Society X LU and R. A. Weiss, Nov. 9, 1992.
Melt-Processable Polypeptide/Ionomer Molecular Composites–American Chemical Society–R. A. Weiss, L. Shao, R. D. Lundberg, Nov. 9, 1992.
Characterization Of Blends Of An Amorphous Polyamide With Lightly Sulfonated Polystyrene Ionomers–Polymer Engineering & Sciensce Sullivan And Weiss Apr. '1992.
Characterization Of Blends Of Nylon-6 And Lightly Sulfonated Polystyrene Ionomers, Antec, J. Shaskus, Jr and R. A. Weiss, May 1993.
Graft Copolymers Of Polystyrene And Polyisoprene Prepared By Complexation Of Functionalized Homopolymers, R. A. Weiss And S. Sasongko (1991).
Development Of Miscible Blends Of Polyamide-6 And Manganese Sulfonated Polystyrene Using Specific Interastions X. Lu & R. A. Weiss (1991).
Miscibility Enhancement Of Polymer Blends By Specific Chemical Interactions X. Lu & R. A. Weiss (1991).
Miscibility Enhancement Of Polystyrene And Poly (Lakylene Oxide) Blends Using Specific Intermolecular Interactions R. A. Weiss et al. (1990).

Primary Examiner—James J. Seidleck
Assistant Examiner—I. Zemel
Attorney, Agent, or Firm—Fishman, Dionne & Cantor

[57] ABSTRACT

A compatibilizer for polymer blends is presented. The compatibilizer comprises a sulfonated polystyrene and may be used to prepare miscible blends of the sulfonated polystyrene with two or more polymers having polar groups, e.g., polyamides, polyethers, polyesters, polysulfones and polyamines. The sulfonated polystyrene compatibilizer may be used in conjunction with a counterion.

11 Claims, 7 Drawing Sheets

COMPATIBILIZER FOR POLYMER BLENDS AND THE POLYMER BLENDS DERIVED THEREFROM

This is a continuation of application Ser. No. 08/052,809, filed on Apr. 23, 1993, now abandoned.

BACKGROUND OF THE INVENTION

This invention relates generally to compatibilizing agents and, more specifically, to compatibilizing agents for use in producing polymer blends.

Polymer blends are commonly used to combine in a single material a compromise of properties of two different polymers. Unfortunately, due to thermodynamic incompatibility it is often difficult to obtain a blend morphology conducive to useful mechanical properties, e.g., an optimally dispersed phase size and adequate interphase adhesion As a result, considerable research has been directed at development of compatibilizers, i.e., interfacial agents that lower the interfacial tension between the phases of an immiscible polymer blend. Compatibilizers yield smaller dispersed phase sizes and improved mechanical properties. The most common compatibilizers are block copolymers and ionomers, specifically poly(ethylene-co-methacrylic acid) and poly(ethylene-co-acrylic acid) ionomers.

Nylon-6 (N6) is an example of a commercially important engineering thermoplastic. A weakness of N6 is its fracture toughness which has been alleviated in the past by the addition of rubber to N6 and is widely practiced as evidenced by the large number of patents concerned with the development of supertough nylons; see Sen. A., Weiss, R. A., Garton, A. in *Multiphase Polymers: Blends and Ionomers*, Utracki, L. A. Weiss R. A., Eds., ACS Symp. Set. No. 395, Amer. Chem. Soc., 1989, p. 353. A relatively recent paper by Oshinki, A. J.; Paul, D. R.; Keskkula, H., *Polymer Communications*, 1991, 32, 12, 370 describes the use of hydrogenated styrene-butadiene-styrene block copolymers (SEBS) and maleated SEBS (M-SEBS) for toughening N6. The M-SEBS was used as a compatibilizing agent to reduce the dispersed rubber phase size, which resulted in significant toughening of the N6.

However, several problems arise in the use of maleated block copolymers. For example, there is a relatively high cost associated with producing block copolymers. Moreover, hydrogen bonding between the N6 and the carboxylate may also be relatively weak due to the relative weakness of maleic acid.

SUMMARY OF THE INVENTION

The above-discussed and other drawbacks and deficiencies of the prior art are overcome or alleviated by the compatibilizer of the present invention. In accordance with the present invention, a lightly sulfonated polystyrene is used as a compatibilizer for polymer blends involving at least two normally incompatible heteroatom polymers, e.g., polyamides, polyesters, polyethers, polyamines, polypetides, polyurethanes, polysulfones and the like.

In accordance with the present invention, sulfonated polystyrene (SPS) is sulfonated up to 15 molar percent and interacts strongly to form miscible blends with at least two polar polymers (such as from the above group). The formation of sulfonated polystyrene has been clearly defined in U.S. Pat. No. 3,870,841, which is incorporated herein by reference. More general techniques for the sulfonation of either unsaturated or non-aromatic polymers is described in U.S. Pat. Nos. 3,856,511; 3,642,728; 3,847,854 and 3,877,530, all of which are fully incorporated herein by reference.

The SPS component is present in an amount effective to provide a miscible blend to at least two heteroatom polymers (usually in a range of up to about 50 weight percent relative to the entire polymer blend). Preferably, the SPS component is present in an amount of less than about ten percent by weight relative to the entire polymer blend. The result is compatibilization of the polymers, i.e. the dispersed phase size is significantly reduced, the interphase adhesion is improved and the mechanical properties (specifically tensile strength and toughness) are improved.

The SPS compatibilizer of the present invention provides many important and desirable features. For example, when the SPS compatibilizer is used with Nylon-6, hydrogen bonding (confirmed by infrared spectroscopy) between the sulfonate and N6 is stronger than for a carboxylate due to its greater acid strength. When specific metal cations are used, e.g., lithium, maganese or zinc, ion dipole complexes form that are stronger than the interactions between the acid derivation and N6. In addition, the synthesis of SPS is potentially more economical than traditional block copolymer compatibilizers. Blends of an amorphous polyamide and SPS (both the acid derivative and sodium and zinc salts) yield much finer dispersed phase sizes than comparable polyamide/PS blends. When the sulfonation/amide ratio is sufficiently high, miscible blends may be produced in accordance with this invention.

The use of SPS as a compatibilizer provides numerous features and advantages relative to the prior art. For example, the size of the dispersed phase is reduced significantly. Additionally, interphase adhesion is improved resulting in improved tensile strength and toughness. An important and surprising aspect of the present invention is the ability to control the compatibilization, i.e., the interphase adhesion, dispersed phase size and mechanical properties, by changing the counterion used in the SPS compatibilizer. This feature provides a more facile control of compatibilization than is possible with the presently practiced technology.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
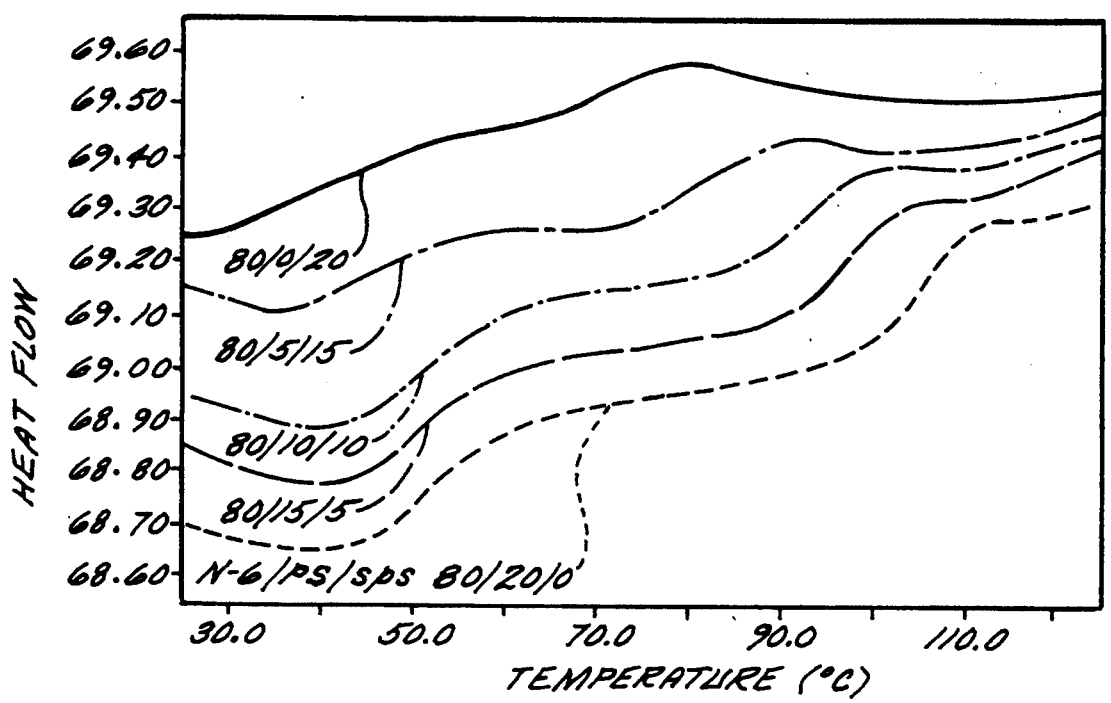
FIGS. 1 and 3 are graphs showing calorimetric data (heat flow versus temperature) for various nylon, polystyrene and sulfonated polystyrene blends without a metal cation 4.9 mol % sulfonation)
Figure 2:
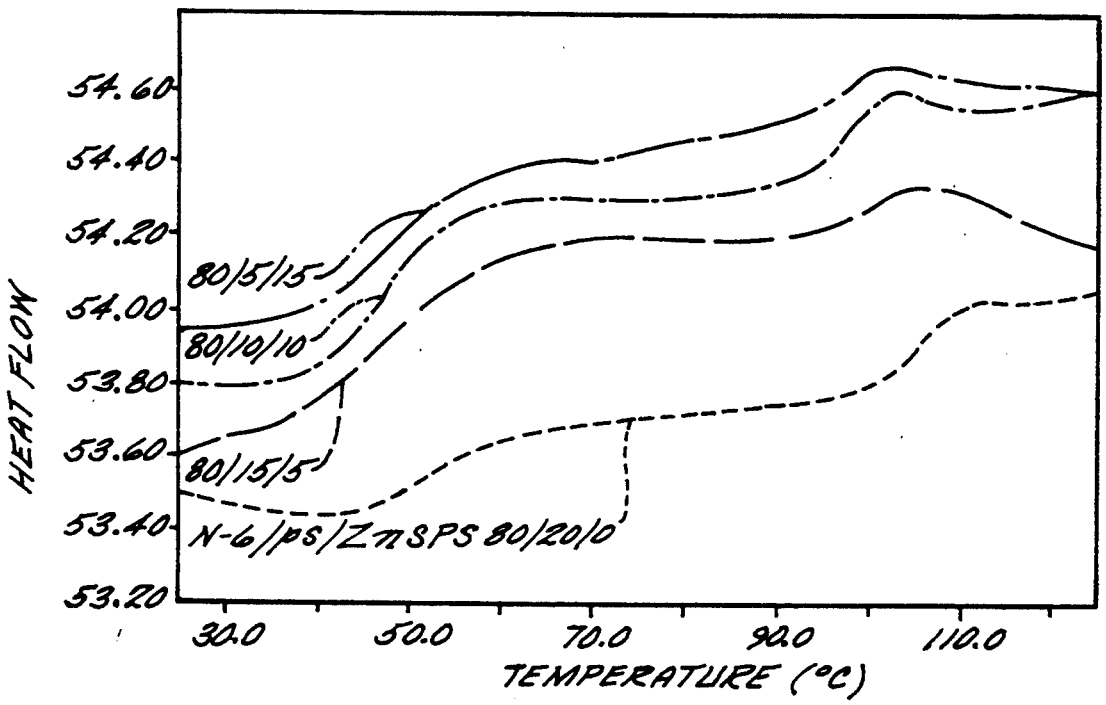
FIGS. 2 and 4 are graphs showing calorimetric data (heat flow versus temperature) for nylon, polystyrene, sulfonated polystyrene (4.9 and 7.5 sulfonation) neutralized with a metal cation.
Figure 3:
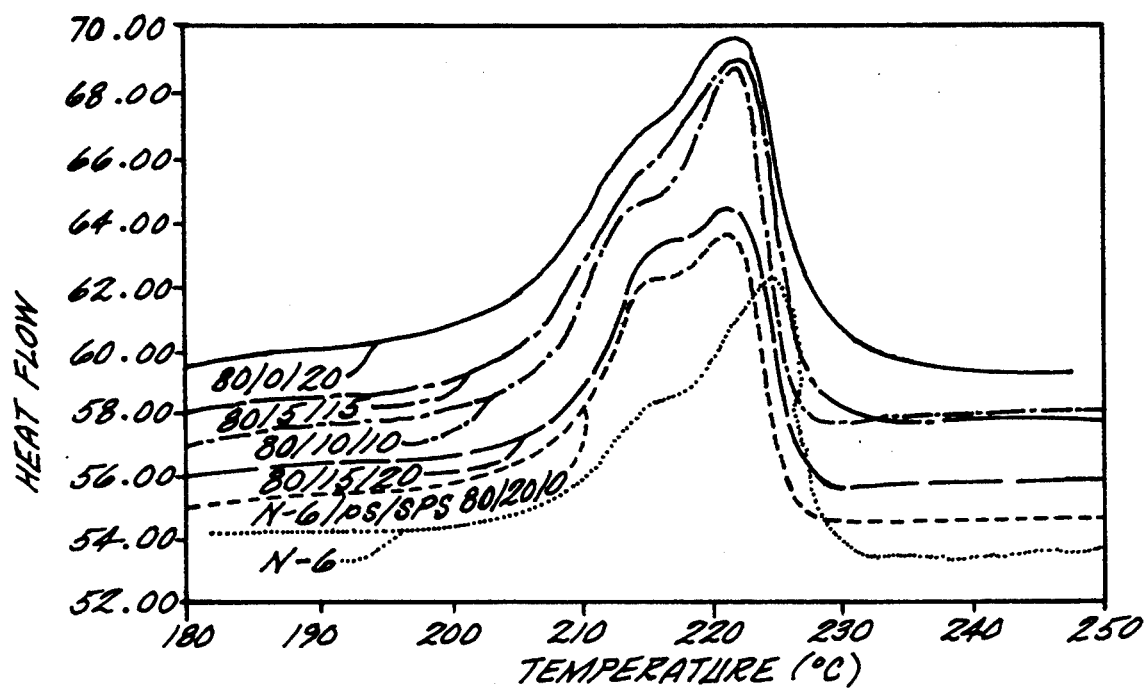
Figure 4:
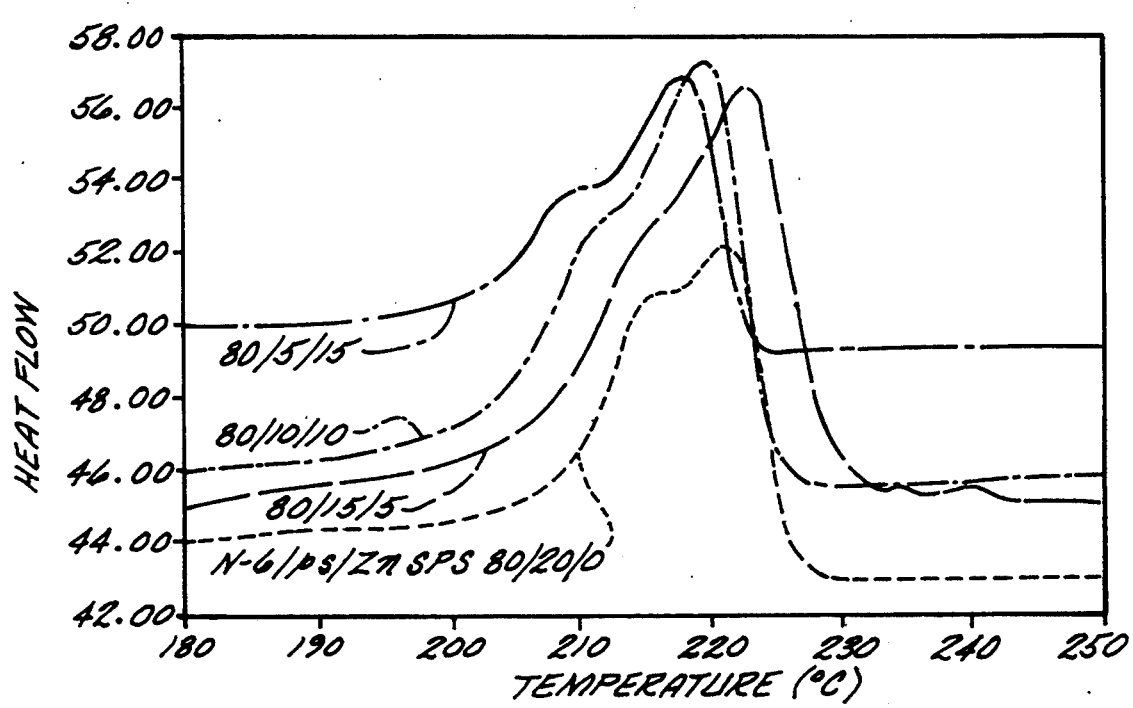
Figure 5D:
FIGS. 5A-5D are electron micrographs of the polymer blend of FIGS. 1 and 3.
Figure 5A:
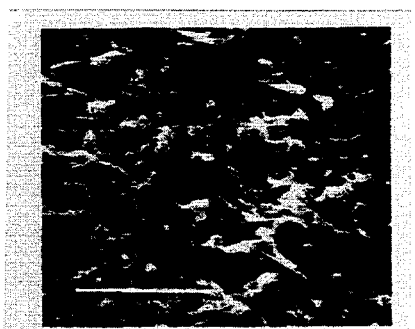
Figure 5C:
Figure 5B:
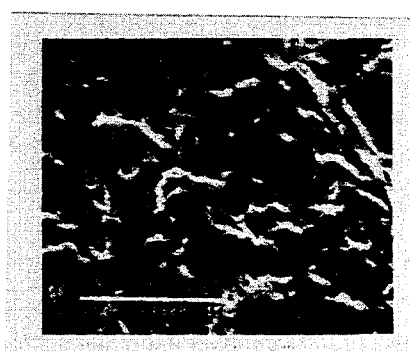
Figure 6D:
FIGS. 6A-6D are electron micrographs of the polymer blend of FIGS. 2 and 4.
Figure 6A:
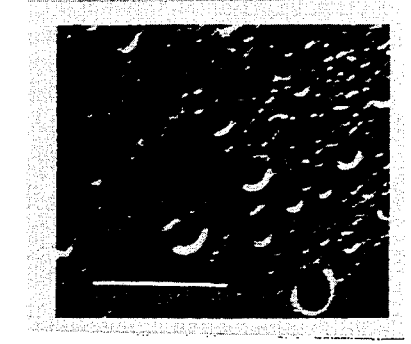
Figure 6C:
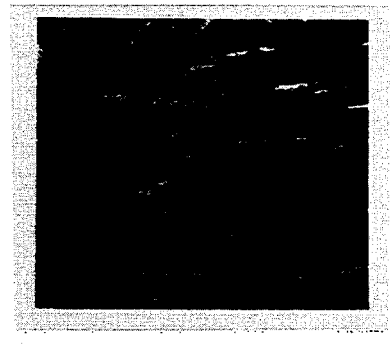
Figure 6B:
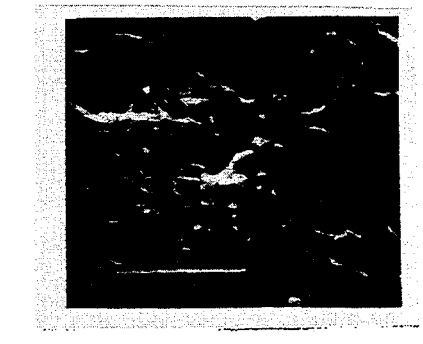

The present invention comprises a compatibilizing agent for forming miscible blends of heteroatom polymers. The compatibilizer includes a sulfonated polystyrene (SPS) which interacts with at least two polar polymers e.g., having an amide, ester, ether, sulfone or amine group to form miscible blends of SPS and at least two heteroatom polymers. Thus, blends of two polar polymers which normally are incompatible may be compatibilized in the presence of SPS. Further, strongly interacting blends of SPS and polypetide or a liquid cystalline polyester have been formed.

In accordance with the present invention, polystyrene is preferably lightly sulfonated from 0-15 mol %, (based on the repeat unit), in order to form miscible blends with heteroatom or polar polymers having, for example, amide, ester, ether, sulfone or amine groups. For forming other cross blends of polymers having polar groups, for example a polyamide and a polyether blend, an addition of less than ten percent by weight of SPS to compatibilize or significantly reduce the dispersed phase size and improve the interphase adhesion is preferred. However, the final amount of SPS should be present in an amount effective to compatibilize the at least two polar polymers (typically no more than 50 wt. % SPS).

SPS is a homopolymer characterized by the following formula:

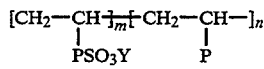

where P is aromatic, m/(m+n) is the molar percent sulfonation, and Y=H (i.e., for sulfonic acid derivative) or is a cation that is employed to neutralize or at least partially neutralize the SPS. Typical, but not limiting examples of suitable counterions are those selected from Groups IA, IIA, Ib, IIB, VIIB, and VIIIB of the Periodic Table. Particularly suitable metal cations are lithium, zinc, nickel, copper and manganese, and especially preferred metal cations are manganese, zinc and lithium. The distribution of the two repeat units shown in the formulation above may be random or blocks.

The effects of the novel compatibilizer in accordance with the present invention are enhanced by the use of a counterion or cation which is employed for neutralizing or at least partially neutralizing the SPS. It will be appreciated that any suitable cation may be used, although, in order of more preferable to less preferable, counterions of the following are considered preferable for use: manganese, zinc, lithium, hydrogen and sodium. Transition metal salts e.g., manganese and zinc are considered to be most preferable.

As mentioned, heteroatom polymer blending is enhanced by the compatibilizing agent of the present invention. In accordance with a significant feature of the present invention, the mechanical properties of the resultant blend are improved as a result of the more compatibilized blend. Specifically, tensile strength and toughness of the resultant blend are improved because of the relative acidic strength of sulfonate which, in turn, causes strong interpolymer interactions.

The present invention will now be described with respect to the following non-limiting examples:

EXAMPLE 1

SPS containing 4.9 mol % sulfonic acid groups was prepared by sulfonating a polystyrene (PS) manufactured by Polysciences, with a $M_n$=ca of 30,000 using the process described in U.S. Pat. No. 3,870,841 to Makowski et al. which is fully incorporated herein by reference. The sulfonation level was determined by titration of the polymer in a 90%/10% toluene/methanol solution with potassium hydroxide in methanol. A zinc salt was prepared by adding a 10 mol % excess of zinc acetate to a toluene/methanol solution of SPS. The neutralized polymer was precipitated by steam stripping, washed with methanol and dried at 50° C. in a vacuum oven. The nylon-6 (N6) was manufactured by Polysciences, Inc. and included an average molecular weight of 24,000 and the polystyrene used for the blends was manufactured by Dow Chemical Co. and had an $M_n$=ca. 100,000.

All blends contained 80 wt % N6. Blends were melt-mixed for 7 min. at 270° C. in a Brabender, mixer, using a 30 cc fixed roller blade mixing head. The roller speed was 20 rpm and a nitrogen purge was used to minimize degradation of the materials. After mixing, the material was removed quickly from the chamber. The blend compositions are summarized in Table 1. Wherein xx, yy, and zz are the mass fractions of N6, PS, and SPS, respectively.

TABLE 1

| | $T_{g1}$ | $C_{R1}$ | $T_{g2}$ | $C_{g2}$ | peak | area | $\Delta H_m$ | onset |
|---|---|---|---|---|---|---|---|---|
| ACID BLENDS composition nylon/PS/SPS | | | | | | | | |
| 80/20/0 | 51.7 | .062 | 105.2 | .077 | 221.2 | 312.4 | 35.1 | 208 |
| 80/15/5 | 51.5 | .052 | 97.2 | .063 | 221.5 | 314.9 | 37.7 | 209 |
| 80/10/10 | 51.2 | .079 | 93.6 | .060 | 221.7 | 364.0 | 39.5 | 207 |
| 80/5/15 | 43.4 | .052 | 82.1 | .049 | 222.1 | 417.0 | 39.0 | 206 |
| 80/0/20 | 38.7 | .034 | 71.4 | .014 | 221.0 | 409.8 | 39.1 | 208 |
| 100/0/0 | 42.7 | .352 | NA | NA | 223.9 | 296.0 | 45.7 | 212 |
| ZINC BLENDS nylon/PS/ZnSPS | | | | | | | | |
| 80/20/0 | 51.7 | .062 | 105.2 | .077 | 221.2 | 312.4 | 35.1 | 208 |
| 80/15/5 | 46.2 | .076 | 99.1 | .024 | 222.9 | 419.7 | 35.5 | 207 |
| 80/10/10 | 46.6 | .141 | 97.9 | .067 | 219.6 | 388.7 | 32.2 | 207 |
| 80/5/15 | 48.8 | .143 | 95.8 | .037 | 218.0 | 278.1 | 35.2 | 206 |

The blends were ground in a Wiley mill and compression molded under a nitrogen purge at 270° C. into dogbone-shaped specimens ca, 40 mils thick using a heat press manufactured by Carver Laboratory.

Glass transition temperatures ($T_g$), melting temperature ($T_m$) and heat of fusion ($H_m$) were measured with a Perkin-Elmer differential scanning calorimeter (DSC), model DSC-7. The temperature range covered was 0°–250° C. and a nitrogen atmosphere was used. The heating and cooling rates were 20° C./min and the sample sizes ranged from (6)–(12) mg.

Tensile measurements were made with an Instron 1011 using a 100-pound load cell with a crosshead speed of 2 in/min. It will be understood that initial modulus, yield stress, stress at break, yield elongation and elongation at break and fracture toughness were calculated from the force elongation curve and the area under the curve, respectively.

Referring generally to FIGS. 1–4, DSC thermograms of the various blends are shown and they are summarized in Table 1. In the nylon-6/PS blend (designated 80/20/0), two distinct $T_g$'s were observed indicating phase separation. For the acid and zinc neutralized samples, two $T_g$'s were also observed, but the temperature interval between the two $T_g$ values decreased significantly compared with the N6/PS blend. The changes in the $T_g$'s were greater for the blend containing the sulfonic acid derivative. This indicates that there was improved mixing between the phases. In the acid blends, the $T_g$ of the nylon phase remained relatively constant although decreasing lack of definition with increasing sulfonation made assigning a $T_g$ difficult. In the zinc neutralized blends the $T_g$ of the nylon phase increased with increasing zinc sulfonate levels. In both the acid and zinc neutralized blends the $T_g$ of the polystyrene phase decreased significantly. The other major difference between the zinc neutralized and acid blends was the $T_m$ behavior. The acid blend $T_m$ values remained constant, although the peaks broadened and the $H_m$ values increased. In the zinc neutralized blends, the $T_m$ peak decreased with increasing zinc sulfonate level indicating a stronger complexation of the blends occurring.

Micrographs shown in FIGS. 5A–5D and 6A–6D were obtained with a Amray model 1200 B scanning electron microscope (SEM) using 15 keV. The compression molded samples were cut using a razor blade and sputter coated with a 10 nm thick layer of gold to provide a conductive path. Magnifications of 1900× and 4600× were used.

SEM micrographs of the various acid blends provide the most direct evidence of compatibilization and decrease in the dispersed phase size. The nylon-6/PS blend (80/20/0) exhibited gross phase separation with the polystyrene phase ranging from 9–15 μm in size dispersed in the continuous nylon phase. With the addition of small amounts of SPS, the size decreased to 0.5–2 mm for (80/10/10) and 0.1–1.0 mm for both (80/5/15) and (80/0/20). The zinc blends showed the same progression from 0.2 to 3 μm (80/15/5) to 0.1 to 1 μm (80/10/10) to 0.1 to 0.5 μm (80/5/15). These results supported the DSC results based conclusions that specific physical interactions between the polymers lowered the interfacial tension and reduced the dispersed phase size.

In a previous paper by Lu, X. and Weiss, R. A.; Macromolecules, 1991, 24, 4381, which is incorporated herein by reference, it was shown by Fourier transform infrared (FTIR) spectroscopy that hydrogen bonding of the sulfonate and amide groups and complexation between the transition metal cation and the amide nitrogen occurred in ZnSPS/N6 blends. This conclusion was based on three observations: 1) Shift of the sulfonate anion vibrations at 1135 cm$^{-1}$ (asymetric stretch) and 1045 cm$^{-1}$ (symmetric stretch) with the addition of N6 to ZnSPS. 2) broadening of the amide band centered around 3300 cm$^{-1}$ (hydrogen bonded amide) and the resolution of an absorption at 3410 cm$^{-1}$ (non-hydrogen bonded amide that is shifted to lower frequency as a result of complexation with the zinc cation; and 3) development of new absorptions at 3520 and 1600 cm$^{-1}$ (associated with the amide nitrogen) and 990 cm$^{-1}$ (associated with the sulfonate group).

Accordingly, it will be appreciated that in accordance with the present invention, by adding low concentrations of sulfonated polystyrene or zinc neutralized sulfonated polystyrene to nylon-6/polystyrene blends reduces the dispersed phase size. This is most likely due to hydrogen bonding between the amide groups and the sulfonic acid repeat and ion-dipole complexation between the amide groups and the metal sulfonate groups.

EXAMPLE 2

Polyamide/polyether blend (specifically, Nylon 6 and poly(2,6 dimethyl phenylene oxide) or PPO). This is similar to a commercial high performance polymer blend sold by General Electric under the tradename Noryl GTX.

Figure 7A:
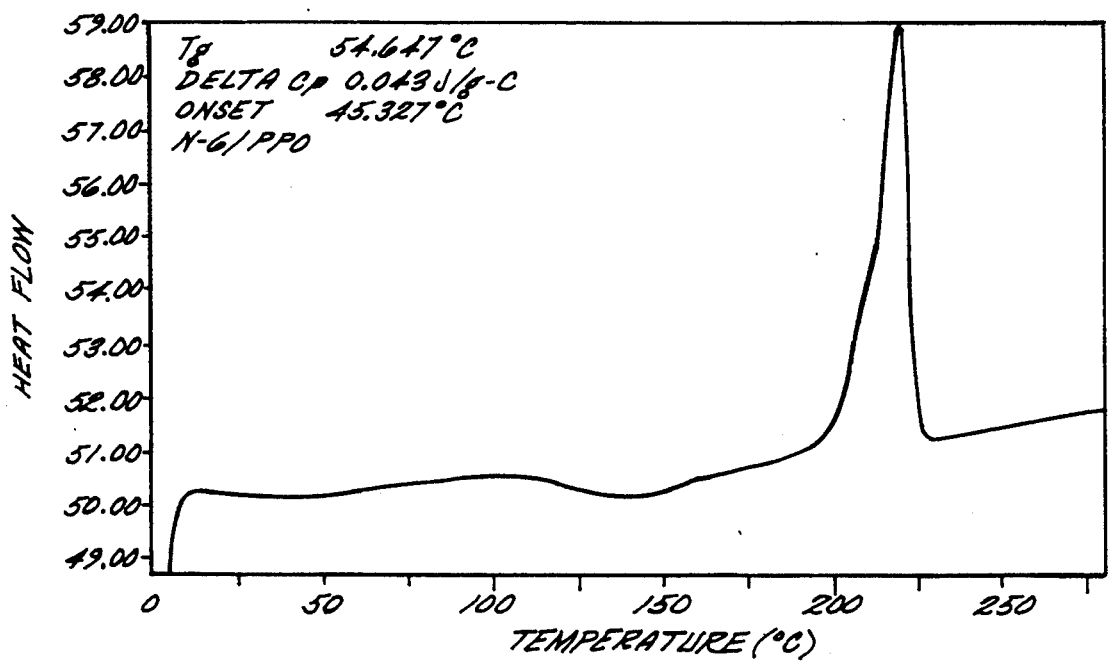
FIG. 7A is a graph showing calorimetric data (heat flow versus temperature) of a 50/50 blend of a polyamide and polyether.
Figure 7B:
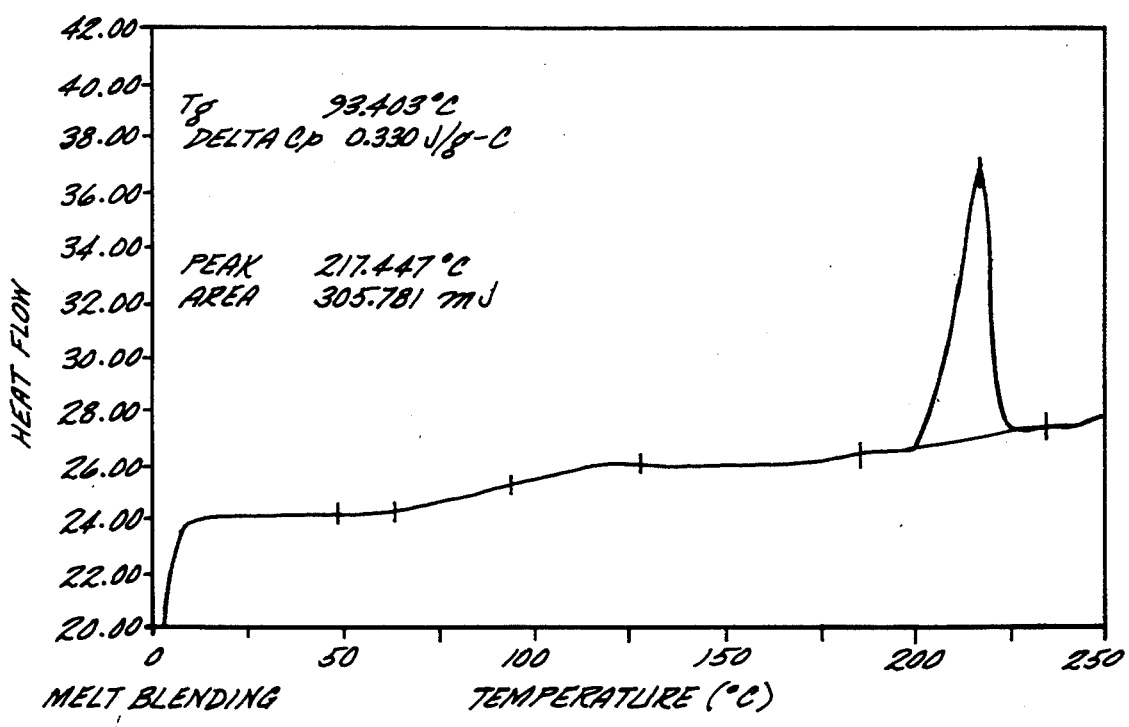
FIG. 7B is a graph showing calorimetric data (heat flow versus temperature) of a (45/45/10) blend of polyamide, polyether, zinc sulfonated polystyrene (10 mol % sulfonation)
Figure 8A:
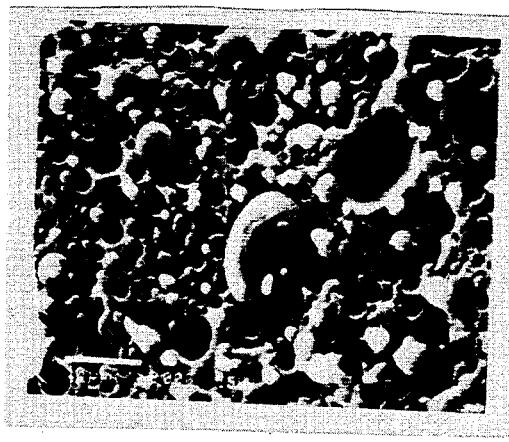
FIG. 8A is a scanning electron microgram of the polymer blend of FIG. 7A.
Figure 8B:
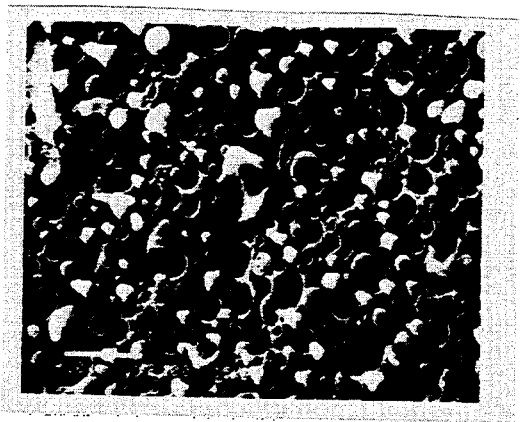
FIG. 8B is a scanning electron microgram of a (45/45/10) blend of polyamide, polyether and polystyrene.
Figure 8C:
FIG. 8C is a scanning electron microgram of the polymer blend of FIG. 7B.

FIGS. 7A and 7B show the differential scanning calorimetry thermograms of a 50/50 nylon 6/PPO blend and a 45/45/10 blend of nylon 6/PPO/ZnSPS. There is a substantial increase in the glass transition temperature of the nylon 6 phase (55° C. to 93° C.) which it will be appreciated indicates compatibilization. The micrographs in FIGS. 8A and 8B show the morphology of melt mixed blends of nylon 6 and PPO (1:1 weight ratio) with and without the addition of 10% polystyrene of ZnSPS as a compatibilizer. In accordance with an important feature of the present invention, the remarkable decrease in the dispersed phase size will be noted when ZnSPS is used showing the effect of ZnSPS to compatibilize N6 and PPO.

EXAMPLE 3

Polyester/polyester blend (specifically a liquid crystalline copolyester, which is manufactured by Hoechst-Celanese Co. and sold under the trademark "Vectra A950", with bisphenol A polycarbonate). It will be appreciated that liquid crystalline polymer (LCP)/polymer blends generally exhibit poor interfacial adhesion between an LCP dispersed phase and a thermoplastic polymer matrix. See for example, Dutta D., H. Fruitnala, A. Kohl, and R. A. Weiss, Polymer Eng. Sci.,30, 1005–1018 (1990). This can be improved by chemical reaction between the two polymers if a copolyester LCP and a polyester matrix, e.g, poly(ethylene terephthalate) are used, largely because transesterification may occur between the two polymers in the melt leading to covalent bonds between the phases.

Figure 9:
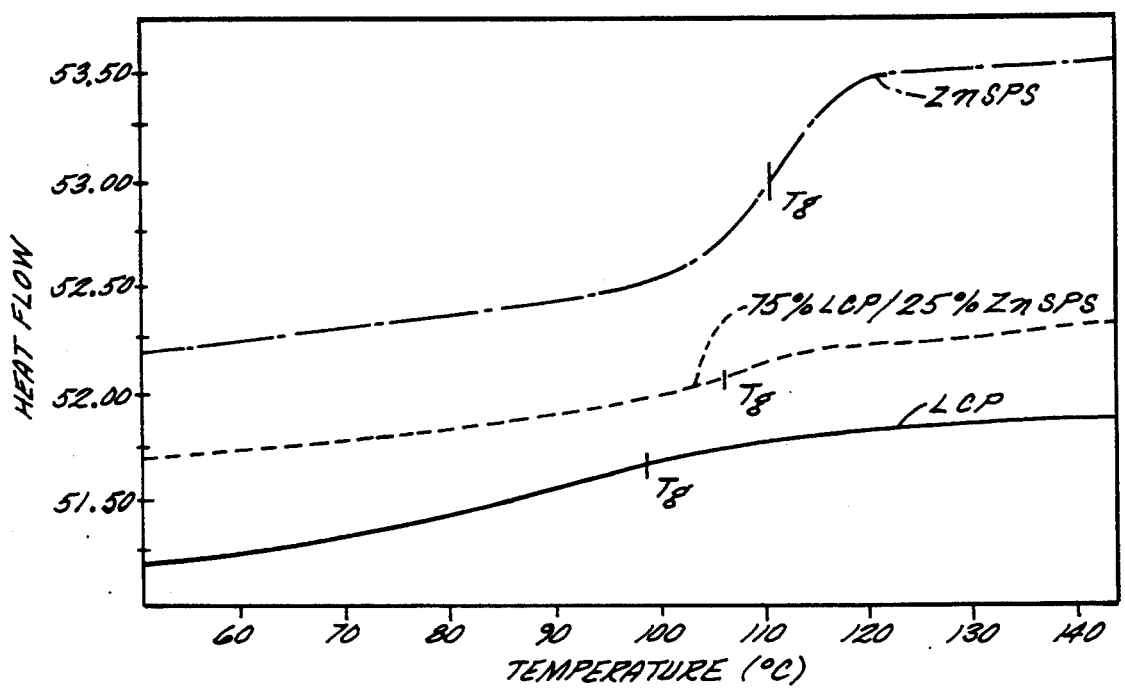
FIG. 9 is a graph showing calorimetric data (heat flow versus temperature) of separate liquid crystalline polymer and zinc sulfonated polystyrene (10 mol % sulfonation) and a (75/25) blend of the two.
Figure 10:
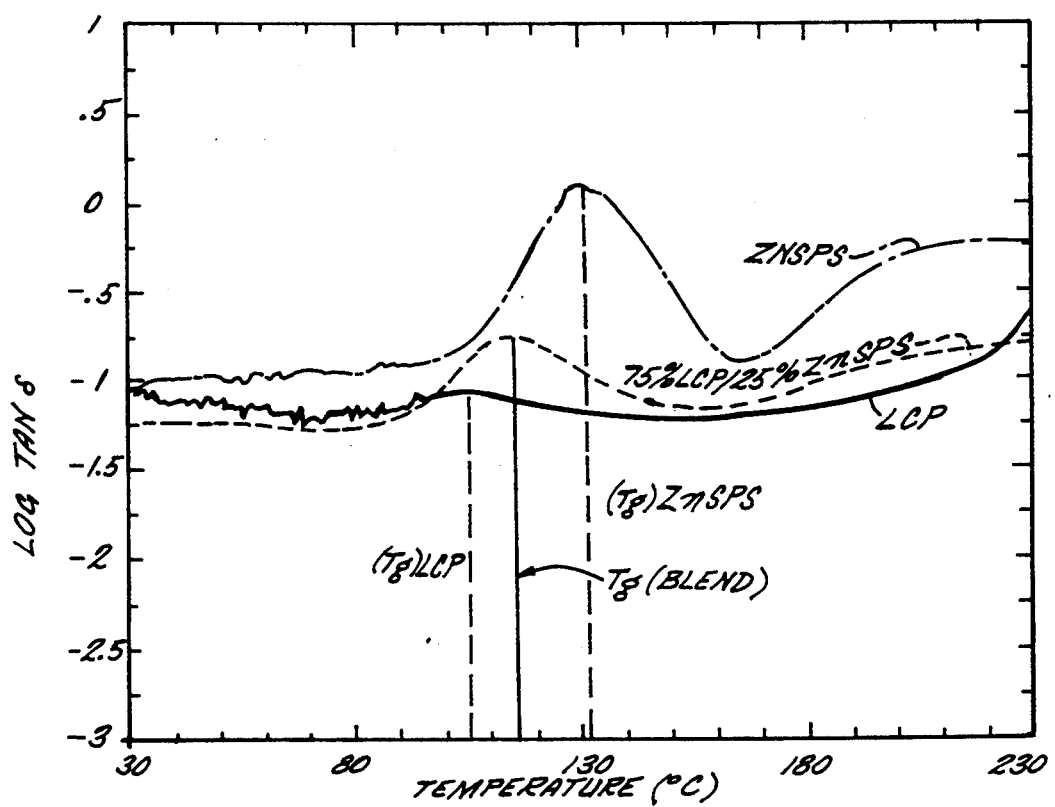
FIG. 10 is a graph showing the Log Tan 6 versus temperature of the materials of FIG. 9.

In accordance with the present invention, the addition of ZnSPS to an LCP/polycarbonate blend improved the adhesion between the phases and the tensile properties without the formation of covalent bonds between the two polymers. The LCP/polycarbonate blend (18 % wt LCP) without the ionomer compatibilizer or with the addition of polystyrene as a compatibilizer exhibited brittle fracture surfaces, while a blend with a ZnSPS compatibilizer showed a ductile fracture surface. FIG. 9 shows DSC thermograms for a blend of LCP and ZnSPS (75/25 wt) and the individual component polymers. Note that for the blend, only a single, broad $T_g$ was observed intermediate between those of the two component polymers providing evidence of increased miscibility of these polymers. Similarly, the dynamic mechanical curves in FIG. 10 also show that the blend exhibits a single tan 6 peak intermediate in temperature between those of the two pure polymers. These results clearly indicate there is considerable molecular mixing of the two polymers.

Figure 11:
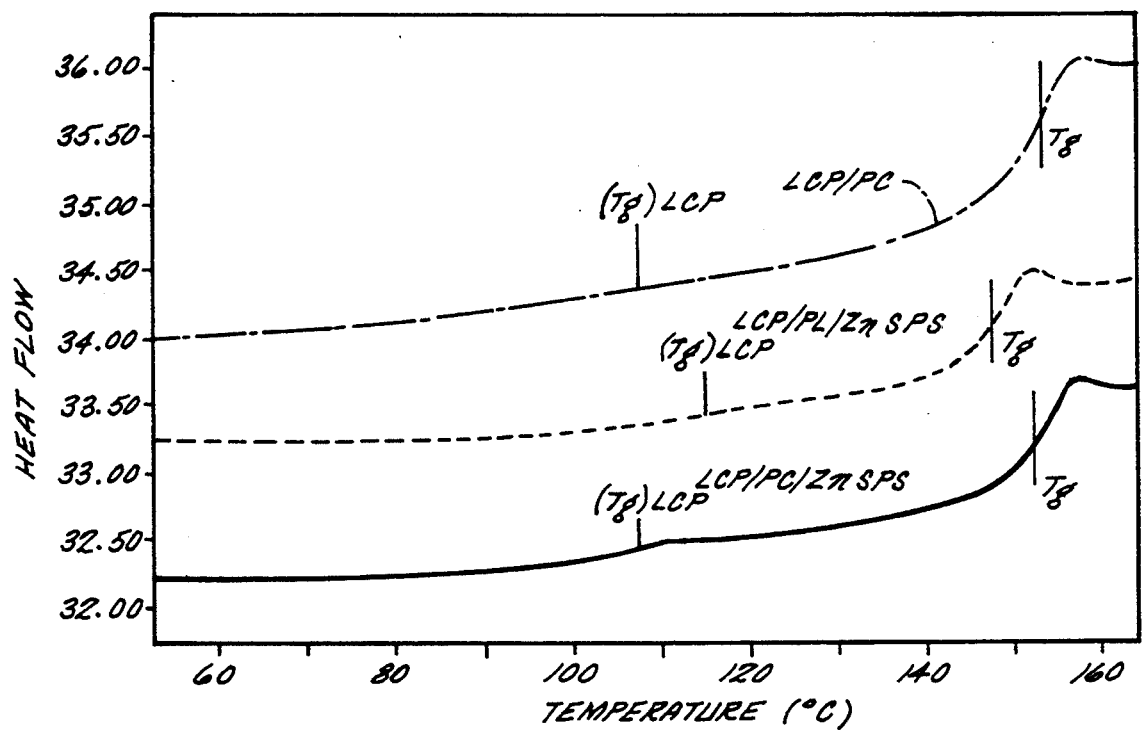
FIG. 11 is a graph showing calorimetric data (heat flow versus temperature) of various blends.

FIG. 11 shows the DSC thermograms of an LCP/PC blend (18% LCP) and ternary blends containing 10% polystyrene or ZnSPS. All blends contained 18% LCP. The clearest $T_g$ is that of the PC phase at ca. 150° C. It is evident that in the blend containing ZnSPS this $T_g$ is shifted about 6° C. lower in temperature which is a clear sign of compatibility of the ionomer and the LCP. Very little, if any, shift was seen when PS was used. The lower $T_g$ of the LCP phase is more difficult to resolve, but it also appears that this transition is increased by the addition of ZnSPS. This would be expected if compatibilization between the PC and ZnSPS also occurred. Thus, it does appear that, in accordance with the present invention, ZnSPS is a true compatibilizer for the PC/LCP blend.

Figure 12:
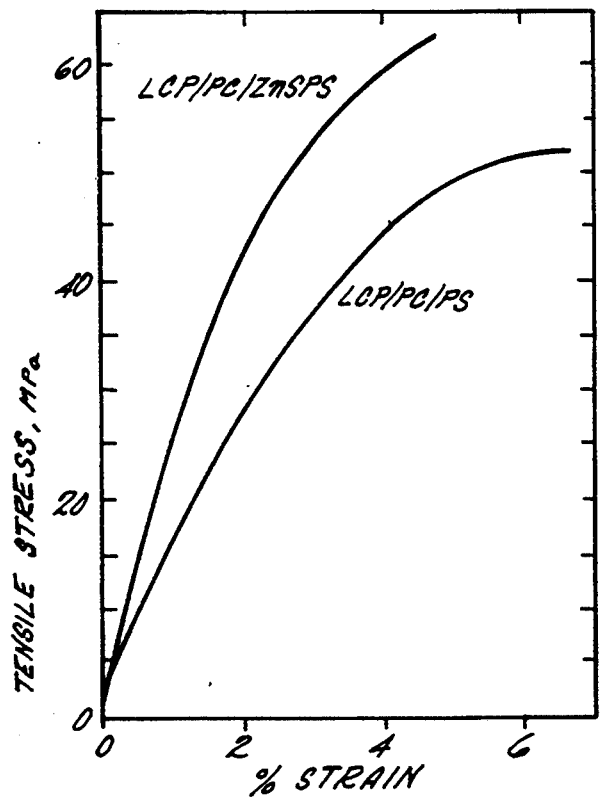
FIG. 12 is a graph showing tensile stress versus % strain of the polymer blends of FIG. 11.

FIG. 12 shows the stress-strain curves for LCP/PC/PS and LCP/PC/ZnSPS blends with compositions of 18/72/10% by weight. In accordance with the present invention, the addition of the ZnSPS improved the tensile modulus, the tensile strength and the tensile toughness.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A compatibilized polymer blend, comprising: at least two polymers wherein said at least two polymers are incompatible; and
   up to 15 mol % sulfonated polystyrene homopolymer, said sulfonated polystyrene homopolymer being present in an amount and with % of sulfonation effective to compatibilize said at least two polymers to form a compatibilized blend of at least three polymers including said sulfonated polystyrene homopolymer and said at least two polymers.

2. The blend of claim 1 further including:
   a cation in an amount effective to at least partially neutralize said sulfonated polystyrene.

3. The blend of claim 2 wherein:
   said cation is from the Groups IA, IIA, IB, IIB, VIIB and VIIIB of the periodic chart.

4. The blend of claim 1 wherein:
   said polymers are selected from the group consisting of polyamines, polyethers, polyesters, polyamides, polypeptides and polysulfones.

5. The blend of claim 4 wherein said polyesters include:
   aromatic liquid crystalline polyesters.

6. The blend of claim 1 wherein:
   said sulfonated polystyrene is present in an amount of less than about 10 weight percent with respect to the entire blend.

7. The blend of claim 1 wherein:
   said at least two polymers comprise nylon 6 and polystyrene.

8. The blend of claim 1 wherein:
   said at least two polymers comprise nylon 6 and poly(2, 6 dimethyl phenylene oxide).

9. The blend of claim 1 wherein:
   said at least two polymers comprise aromatic liquid crystalline polyester and polycarbonate.

10. The blend of claim 1 wherein said sulfonated polystyrene comprises zinc sulfonated polystyrene and wherein:
    said at least two polymers comprise nylon 6 and polysulfone.

11. The blend of claim 1 wherein said sulfonated polystyrene comprises:
    zinc sulfonated polystyrene.

* * * * *

UNITED STATES PATENT AND TRADEMARK OFFICE
CERTIFICATE OF CORRECTION

PATENT NO. : 5,422,398
DATED : June 6, 1995
INVENTOR(S) : Robert A. Weiss

It is certified that error appears in the above-identified patent and that said Letters Patent are hereby corrected as shown below:

Column 1, line 35, delete "Set." and insert therefor --Ser.--
Column 3, line 14, delete "6" and insert therefor -- $\delta$ --
Column 7, line 10, delete "6" and insert therefor -- $\delta$ --

Signed and Sealed this

Tenth Day of April, 2001

Attest:

NICHOLAS P. GODICI

Attesting Officer     Acting Director of the United States Patent and Trademark Office